United States Patent

Cires et al.

[11] Patent Number: 5,813,611
[45] Date of Patent: Sep. 29, 1998

[54] COMPACT PRESSURE BALANCED FULCRUM-LINK NOZZLE

[75] Inventors: Alfredo Cires, Palm Beach Gardens; Jennifer Groceman, Lake Worth, both of Fla.

[73] Assignee: United Technologies Corporation, Hartford, Conn.

[21] Appl. No.: 721,890

[22] Filed: Sep. 27, 1996

[51] Int. Cl.[6] .................................................. B64C 15/06
[52] U.S. Cl. ............................................. 239/265.37
[58] Field of Search .................. 239/265.19, 265.35, 239/265.37, 265.39; 60/228–232

[56] References Cited

U.S. PATENT DOCUMENTS

| | | |
|---|---|---|
| 3,792,815 | 2/1974 | Swavely et al. . |
| 3,873,027 | 3/1975 | Camboulives et al. ............. 239/265.39 |
| 3,897,907 | 8/1975 | Colley ................................. 239/265.39 |
| 3,899,133 | 8/1975 | Camboulives et al. . |
| 4,049,198 | 9/1977 | Maurer ................................ 239/265.39 |
| 4,440,346 | 4/1984 | Wiley . |
| 4,440,347 | 4/1984 | Madden et al. . |
| 4,447,009 | 5/1984 | Wiley et al. . |
| 4,456,178 | 6/1984 | Jones et al. . |
| 5,011,080 | 4/1991 | Barcza et al. . |
| 5,207,787 | 5/1993 | Lewis ................................. 239/265.39 |
| 5,215,256 | 6/1993 | Barcza . |

FOREIGN PATENT DOCUMENTS 1198435  12/1959  France ..................................... 60/232

*Primary Examiner*—Kevin Weldon
*Attorney, Agent, or Firm*—Norman Friedland

[57] ABSTRACT

The C/D axisymmetrical exhaust nozzle for a gas turbine engine is designed to fit on the engine and STOVL aircraft and includes a combined load balancing piston/synchronization ring that is discretely attached to a fulcrum link for positioning the convergent and divergent flaps of the nozzle. The balancing piston which is motivated by engine's fan discharge air permits the use of smaller hydraulic actuators and the quantity of fuel used as the hydraulic medium required to meet the power needs is significantly reduced.

8 Claims, 4 Drawing Sheets

COMPACT PRESSURE BALANCED FULCRUM-LINK NOZZLE

CROSS REFERENCES

The subject matter of this patent application relates to the subject matter of the patent application entitled "C/D Nozzle With Synchronous Ring Link Suspension" filed by Eric C. Ward Ser. No. 08/721,889 and patent application entitled "Enclosed Pressure Balanced Sync Ring Exhaust Nozzle" filed by Jose Luis Gutierrez, JR. Ser. No. 08/721,888 all of which are being filed contemporaneously and are assigned to the same assignee of this patent application.

TECHNICAL FIELD

This invention relates to a compact convergent/divergent exhaust nozzle utilized on a gas turbine engine and particularly to a shortened exhaust nozzle having the capability of being utilized on a short take-off and vertical landing aircraft (STOVL).

BACKGROUND ART

There are a sundry of convergent/divergent (C/D) exhaust nozzles for gas turbine engines that are disclosed in the literature and that are utilized on jet and turbo jet engines for changing the throat configuration of the nozzle in order to improve engine performance during certain modes of operation. This is particularly the case in aircraft that are powered with gas turbine engines with augmentors. The exhaust nozzle may be configured in a two or three dimensional configuration with or without the capability of vectoring the exhaust gases. Obviously, the purpose of the vectoring nozzle is to effectuate directional change of or reversing thrust to brake the aircraft. Examples of prior art exhaust nozzles are disclosed in U.S. Pat. Nos. 3,792,815 granted to Swavely et al on Feb. 19, 1974 entitled "Balanced Flap Converging/Diverging Nozzle", U.S. Pat. No. 4,456,178 granted to Jones et al on Jun. 26, 1984 entitled "Exhaust Nozzle Assembly With Dual Unison Ring Structure", U.S. Pat. No. 4,456,178 granted to Wiley et al on May 8, 1984 entitled "Three-Dimensional Axially Translatable Convergent/Divergent Nozzle Assembly", U.S. Pat. No. 4,440,347 granted to Madden on Apr. 3, 1984 entitled "Simplified Means For Balancing The Loads On A Variable Area Nozzle", U.S. Pat. No. 4,440,346 granted to Wiley on Apr. 3, 1984 entitled "Axially Translatable Variable Area Convergent/Divergent Nozzle", U.S. Pat. No. 5,011,080 granted to Barcza on Apr. 30, 1991 entitled "Convergent/Divergent Nozzle Construction", and U.S. Pat. No. 5,215,256 granted to Barcza on Jun. 1, 1993 entitled "Flap Hinge Arrangement For A Convergent/Divergent Nozzle" all of which are assigned to the assignee common to the assignee of this patent application and U.S. Pat. No. 3,899,133 granted to Camboulives et al on Aug. 12, 1975 entitled "Nozzles Having A Variable Cross-Section".

Also well known in this art is that engineers and scientist are endeavoring to design and produce a gas turbine engine that is capable of use for STOVL operation for single as well as multiple engine aircraft. Also well known is that the exhaust nozzle may include positional flaps that are articulated to provide vectoring capabilities or the entire exhaust nozzle may be articulated by rotatable inter-connecting ducts similar to what is utilized in the YAK-141 Russian built aircraft (manufactured by Yakovlev Aircraft Company) in order to produce vectoring capabilities. This invention is concerned primarily with the types of variable convergent/divergent exhaust nozzles that are movable by means other than the components of the exhaust nozzle. In other words, a plurality of upstream ducts connected to the exhaust nozzle have the capability of rotating relative to one another to change the direction of the engine flow medium in said ducts and the rotation thereof rotates the entire exhaust nozzle from an axial position for horizontal flight to a radial position for vertical flight and attitudes therebetween and to a transverse position for producing yaw to the aircraft.

Amongst the problems associated with these types of nozzles are that the nozzle must be sufficiently short in order to provide adequate ground clearance during short takeoff and vertical landing operation. In addition certain types of STOVL propulsion systems, such as those that utilize a shaft driven lift fan, require a high response, large turn-down-ratio nozzle to provide acceptable control of the thrust produced by the nozzle in concert with the power extraction required to power the shaft driven lift fan in STOVL mode of operation.

To achieve an acceptable high response nozzle actuation system it is necessary to utilize actuators for varying the throat size of the C/D exhaust nozzle. These actuators typically are hydraulic types of actuators that utilize the engine's fuel for the hydraulic medium. This invention contemplates utilizing an hydraulic actuator utilizing fuel as the hydraulic medium. Moreover, the fuel lines that interconnect the fuel pump and actuators must be flexible in order to accommodate the counter rotating duct function that is utilized to place the exhaust nozzle in the vectoring positions.

As one skilled in this art will appreciate, the size of the actuator that is necessary to match the power requirement of the C/D nozzle actuation system would have to be significantly large and hence, heavy and require adequate envelope. In addition the amount of fuel necessary to accommodate this type of actuator would require significantly large flexible fuel lines. Hence, not only would the size be impractical, but would also be exceedingly heavy and the flexibility of the ducts would be adversely impaired. Moreover, the engine's fuel pump would either be overly taxed or insufficiently sized to accommodate the demand for changing the positions of the flaps in the desired time.

This invention obviates the problems alluded to in the immediate above paragraphs. By virtue of this invention the hydraulic loads required for nozzle actuation are balanced throughout its flight envelope by utilizing a co-axially mounted pressurized piston that has the dual function of serving as a unison ring and a load balancing piston. This allows for a smaller actuator and reduced diameter fuel lines which serve to not only meet the envelope size and power requirements but also permit the use of the desired flexible and compliant fuel lines.

The use of co-axially mounted load balancing pistons results in substantially 50% reduction in nozzle length in comparison to heretofore known balance flap nozzle systems as described in the U.S. Pat. No. 3,792.815 patent, supra.

Additional advantages on the present invention over heretofore known nozzle actuation systems, without limitations thereto, are listed hereinbelow as follows:

1) The number of component parts in the kinematic systems are significantly reduced.

2) The one piece load balancing piston design will undoubtedly reduce the coolant leakage that is evidenced in the heretofore known multi-flap load balancing system.

3) Because the present invention grounds the divergent flap of the C/D nozzle to the pivoting fulcrum links a wide variety of area ratio schedules are now made possible. This provides a great deal of flexibility to the design engineer in tailoring a particular exhaust nozzle to a given engine. For example, the heretofore known C/D exhaust nozzles ground the divergent links to the static structure of the engine which inherently limits the flexibility to design acceptable area ratio schedules in large turn-down-ratio STOVL nozzles.

4) The fulcrum link kinematic design of this invention results in substantially a 50% reduction in the stroke of the actuator as compared to heretofore known designs. This contributes to the reduction in length of the nozzle.

5) Provides a shorter C/D exhaust nozzle which results in a shorter overall length, less weight, less number of components and simplicity in design with an overall economic benefit.

SUMMARY OF THE INVENTION

An object of this invention is to provide an improved C/D exhaust nozzle.

Another object of this invention is to provide a C/D exhaust nozzle for gas turbine engines that is characterized as being shorter than heretofore known C/D exhaust nozzles and is capable of use in STOVL aircraft.

A feature of this invention is the provision of a combined load balancing piston and unison ring for articulating the flaps of the exhaust nozzle. The piston is powered by engine air which may be fan discharge air when employed in a turbo jet engine.

Another feature of this invention is the use of the combined piston/unison ring that permits the elimination of the heretofore known pressure balancing flaps that serve a similar purpose as the piston of this invention.

Another feature of this invention is grounding of the divergent flap links to the pivoting fulcrum links.

Another feature of this invention is the location of the actuation piston and synchronizing link combination so that it is coaxial to the engine's center line.

A still other feature of this invention is the discretely mounted piston/synchronizing link assembly enhances the designs ability to reduce leakage in comparison to heretofore known designs.

Another feature of this invention is that the design of the C/D nozzle utilizing this invention is characterized as being shorter, requires less component parts, is less expensive, less complicated and weighs less than heretofore known designs.

The foregoing and other features of the present invention will become more apparent from the following description and accompanying drawings.

DESCRIPTION OF THE PREFERRED EMBODIMENT

Figure 1:
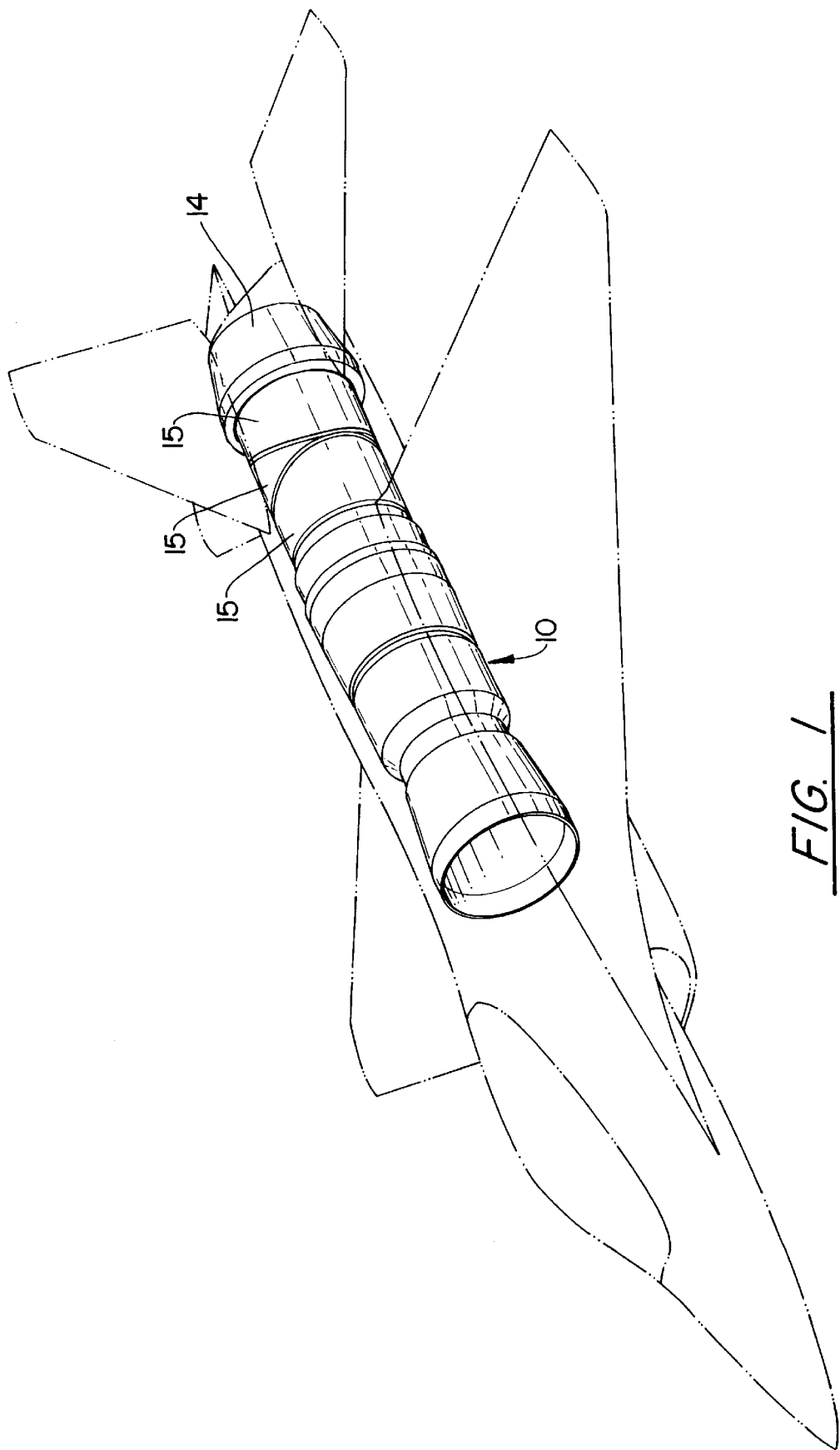
FIG. 1 is a view in phantom and perspective schematically illustrating the turbine power plant mounted in an aircraft with articulating ducts connect to an exhaust nozzle.
Figure 2:
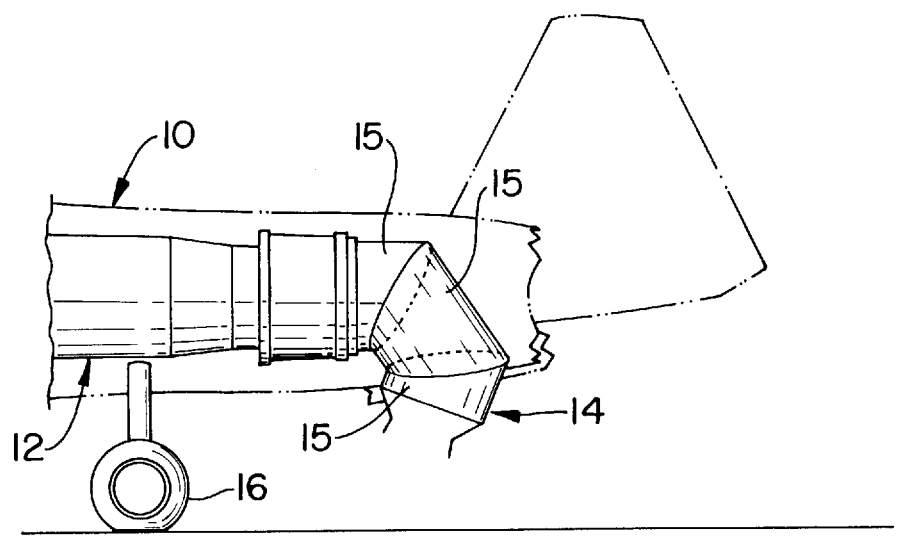
FIG. 2 is partial and phantom views illustrating the ducts being articulated from the position in FIG. 1 for STOVL operation.

To appreciate the significance of this invention this portion of the description will focus on one of the problems that needed to be solved by the invention. As seen in FIGS. 1 and 2 the engine generally indicated by reference numeral 10 is mounted in an aircraft generally indicated by reference numeral 12 which engine includes the exhaust nozzle generally indicated by reference numeral 14 and the three bearing ducts generally indicated by reference numeral 15. The ducts 15 are capable of being counter-rotated and as shown in FIG. 1 are positioned for horizontal flight condition and in FIG. 2 for STOVL condition. Positioning the nozzle for obtaining the vectoring feature is by articulating the three ducts to rotate around the respective bearings to attain the desired attitude. As seen in FIG. 2 when the aircraft is on the ground and the wheels 16 are extended and the exhaust nozzle is in STOVL condition, it is imperative that the length of the exhaust nozzle is sufficiently short so that it doesn't touch the ground.

Figure 3:
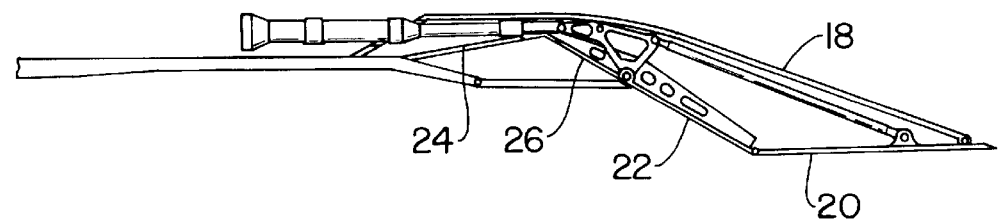
FIG. 3 is a schematic view of a prior art exhaust nozzle.
Figure 3:
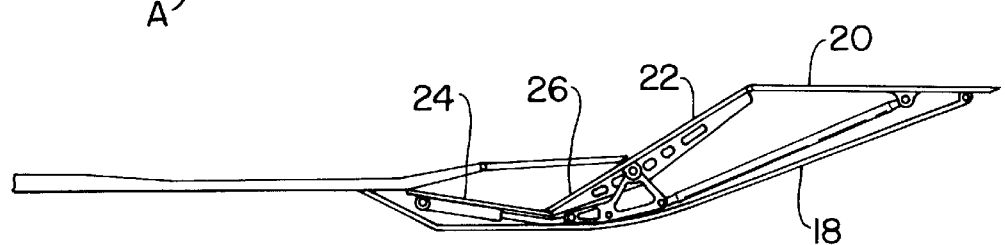

FIG. 3 exemplifies a typical prior art exhaust nozzle that if utilized in the embodiment disclosed in FIGS. 1 and 2, would not be capable of meeting the criteria noted above. As noted in this embodiment the exhaust nozzle consists of the external flaps 18, divergent flaps 20 and convergent flaps 22. In addition to these flaps the prior art exhaust nozzles require balancing flaps which are depicted by reference numerals 24 and 26. For a more detailed description of the prior art exhaust nozzle reference should be made to U.S. Pat. No. 3,792,815, supra and which is incorporated herein by reference. While the structure disclosed in the U.S. Pat. No. 3,792,815 patent discloses a balanced flap arrangement it is substantially the same balancing system disclosed in the FIG. 3 prior showing of the balancing flap system, but is not identical thereto.

Figure 4:
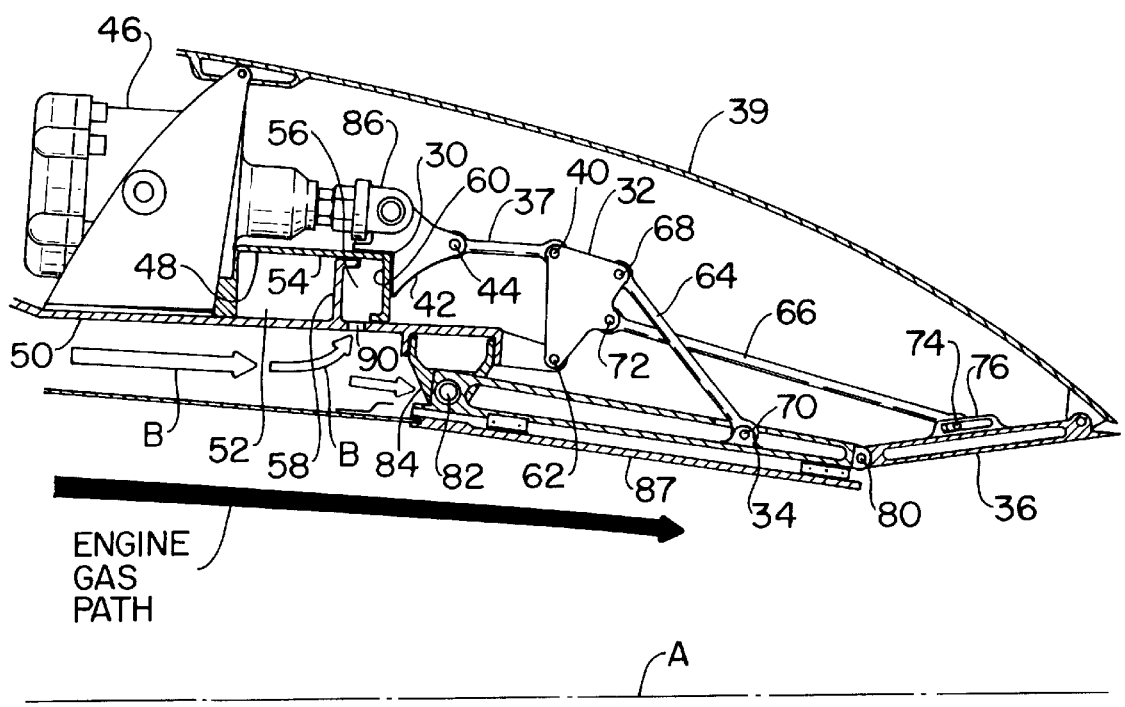
FIG. 4 is a view partly in elevation and partly in section schematically illustrating this invention.
Figure 5:
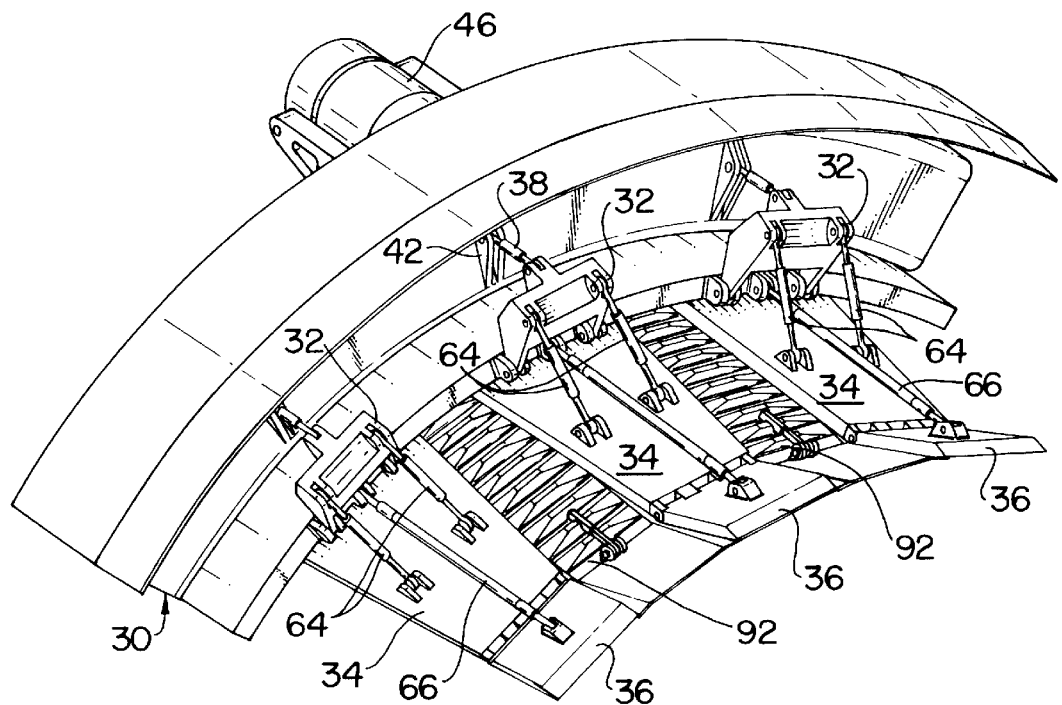
FIG. 5 is a partial view in perspective illustrating this invention.

The concept of this invention is best illustrated in FIGS. 4 and 5 which are views partially in section and partially in elevation and perspective which show the compact axisymmetrical exhaust nozzle as being comprised of a combined actuator synchronizing ring and pressure balancing piston (PBSR) 30, fulcrum links 32, convergent flaps 34, divergent flaps 36 and the attendant connecting links as will be more fully described hereinbelow. An external flap 39 for providing an aerodynamically clean surface is also provided. The fulcrum 32 which is generally triangularly shaped is operatively connected to the hydraulic actuator 46 by the link 38 which is pivotally connected to pivot 40 and the connecting link 42 which is pivotally connected to pivot 44. In this embodiment three actuators are equally spaced about the axis A. The PBSR 30 consist of a toroidally shaped housing 48 that is coaxially mounted relative to the engine's center axis A and is completely enclosed by virtue of the static annular structure 50 for defining chamber 52. Chamber 52 is divided into sub-chambers 54 and 56 by the radially extending annular member 58.

It will become apparent from the description to follow that the housing 48 moves axially relative to the static structure 50 and the chamber 56 serves as a working chamber such that the fluid admitted therein acts against the inner surface 60 of housing 48 much like the action of a typical piston. This pressure serves to urge the housing 48 toward the right as the pressure builds up in chamber 56 urging the connecting member 42 and link 38 to rotate the fulcrum 32 about its pivot connection 62 to balance the load of the flaps. Links 64 and 66 are respectively connected to the convergent flaps 34 via the pivotal connections 68 and 70 and the divergent flaps 36 via the pivotal connection 72 and the sliding connection 74 sliding in track 76 which in turn is integrally formed on the back surface of the flap 36. Obviously, the flaps 34 and 36 are hingedly connected to each other by the hinge connection 80 and the convergent flap is connected to the static structure 50 via the pivotal connection 82 and the fixed support arm 84. The PBSR 30 reacts the loads that are transmitted through the linkage and fulcrum from the convergent flaps and the divergent flaps to balance the load produced thereby. Essentially, this serves a similar purpose as the balancing flaps disclosed in the U.S. Pat. No. 3,792,815 supra, so that these components are eliminated and a significant reduction in the C/D nozzle length is realized.

A cooling liner 87 may be attached to the flap 34 for assuring the structural integrity of the parts. The cooling liner 87 is radially spaced from the flap 34 to define an axial passage for flowing fan air therein to cool the convergent flap. As noted, the conventional seal flaps 92 are utilized to prevent the engine working medium from escaping from the gas path between adjacent flaps.

In operation, to deploy the flaps from the position shown in FIG. 4, for reducing the size of the throat of the nozzle (at the juncture of the divergent and convergent flaps) and changing the C/D configuration, the actuators 46 are actuated by fuel (not shown) in a well known manner which causes the actuator connecting rod 86 to move toward the right. At the same time the pressure from the fan discharge air depicted by arrows B which is admitted through a plurality of holes 90 spaced around the circumference (one being shown) causes the PBSR 30 to add to the force produced by actuator 46. This force is transmitted to the fulcrum 32 via the linkages as described above. The fulcrum 32, in turn, positions the flaps to the desired C/D configuration. Hence, pressure balancing is achieved by virtue of the fan air pressurized piston and since the piston is in reality a synchronizing ring which is attached to all of the convergent and divergent flaps the necessity of the balancing flaps disclosed in the prior art is eliminated. This obviously results in a shorter C/D exhaust nozzle and requires fewer parts. Since the divergent flap links 66 are grounded to the pivoting fulcrum links 32 the engine designer has a great deal of flexibility in selecting area ratio schedules.

It is estimated that there is substantially a 100% reduction in the convergent nozzle length over the heretofore known C/D nozzles. Also this kinematic system which requires less parts than heretofore known systems, results in substantially a 50% reduction in actuator stroke further reducing the overall length of the nozzle.

Figure 6:
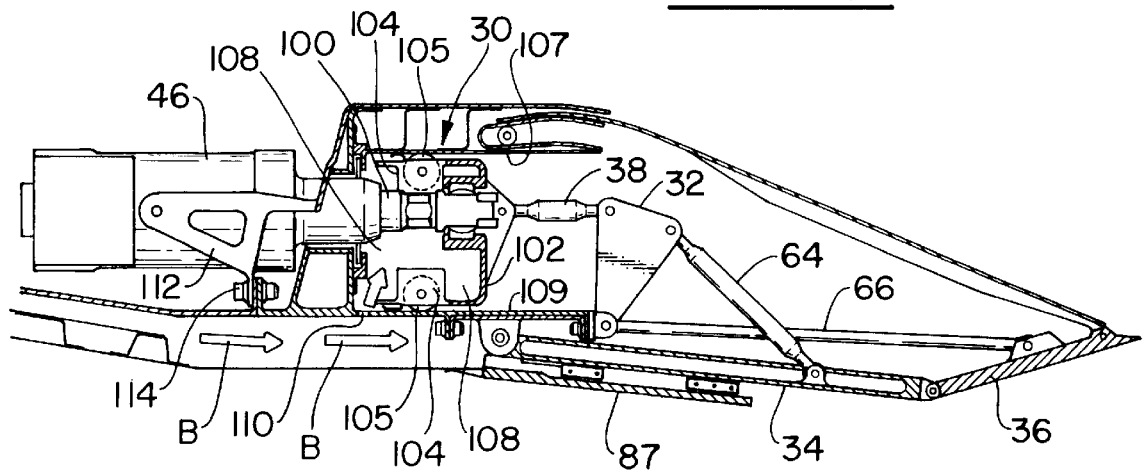
FIG. 6 is a view partly in elevation and partly in section illustrating another embodiment of this invention.

FIG. 6 exemplifies another embodiment of this invention where the actuator 46 (like parts depicted in all the FIGS. bear the same reference numerals) is mounted within the synchronous ring the PBSR 30. The PBSR is configured differently and comprises the housing 102 which is generally U-shaped in cross section and carries a pair of diametrically spaced pockets 104 supporting rollers 105 that each roll on the surface of the annular static structures 107 and 109. These surfaces are sealing surfaces and require suitable sealing members. The working chamber 108, similar to the working chamber 56 in FIG. 4, receives pressurized fan discharge air depicted by arrows B. The positions of the linkages connecting the fulcrum member 32 and actuator 46 and convergent and divergent flaps are slightly altered from that shown in FIG. 4. However, it is apparent from FIG. 6, that the operation of C/D nozzle with this slightly changed linkage system and synchronizing ring/piston combination is substantially the same as that described in connection with the embodiment depicted in FIG. 4. In this embodiment (FIG. 6) it will be appreciated that the mounting bracket 112 supporting the actuator 46 is also slightly modified so that the bracket is attached to flanges formed on the static structure and secured by a plurality of nuts and bolts 114 (one being shown). These modifications permit the exhaust nozzle to remain a full-hoop structure eliminating the weakening cut-outs and facilitating fabrication with these benefits:

1) The full-hoop configuration resists pressure and structural defections to maintain critical sealing surfaces in contact.

2) Placement of the actuators 46 within the synchronization ring reduces torsional moment caused by actuator load being offset from the fulcrum.

3) Airframe installation envelope is reduced by radially inboard relocation of actuators.

4) Synchronization ring is surrounded by static structure, allowing for positive sealing due to possible pressure induced deflections.

5) Relocation of sealing surfaces permits synchronization ring to be a four-sided full-hoop structure to enhance resistance to any variations in convergent flap or actuation load.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A C/D exhaust nozzle for gas turbine engine power plants powering aircraft, said exhaust nozzle including convergent flaps and divergent flaps, a synchronization ring means for positioning said convergent flaps and said divergent flaps, means for actuating said exhaust nozzle to change its C/D configuration, said means includes an actuator connected to said synchronization ring means, said synchronization ring means defining piston means for balancing the loads created by said convergent flaps and said divergent flaps whereby the actuation force required by said actuator is reduced.

2. A C/D exhaust nozzle for gas turbine engine power plants powering aircraft as claimed in claim 1 wherein said turbine power plant includes means for flowing fan discharge air, said piston being powered by said fan discharge air.

3. A C/D exhaust nozzle for gas turbine engine power plants powering aircraft as claimed in claim 2 including a fulcrum, linkage means interconnecting said actuator, said synchronization ring means, said convergent flaps and said divergent flaps to said fulcrum lever.

4. An axisymmetrical C/D exhaust nozzle for gas turbine engine power plants having a central axis powering STOVL aircraft, said exhaust nozzle including convergent flaps and divergent flaps, a synchronization ring means coaxially disposed relative to said axis for positioning said convergent flaps and said divergent flaps, means for actuating said exhaust nozzle to change its C/D configuration, said means includes a hydraulic actuator with engine fuel being the hydraulic medium connected to said synchronization ring means, said synchronization ring means defining piston means for balancing the loads created by said convergent flaps and said divergent flaps whereby the actuation force required by said hydraulic actuator is reduced.

5. An axisymmetrical C/D exhaust nozzle for gas turbine engine power plants having a central axis powering STOVL aircraft as claimed in claim 4 including a static annular structure coaxially disposed relative to said axis, said synchronization ring means including an annular shaped housing including a forward enclosing end concentrically mounted relative to said static structure for defining a working chamber, means for leading engine air to said working chamber through an aperture formed in said static structure.

6. An axisymmetrical C/D exhaust nozzle for gas turbine engine power plants having a central axis powering STOVL aircraft as claimed in claim 5 wherein said fulcrum link is triangular shaped and means for pivotally mounting said fulcrum link to said static structure.

7. An axisymmetrical C/D exhaust nozzle for gas turbine engine power plants having a central axis powering STOVL aircraft as claimed in claim 6 including link means for attaching said divergent flap to said fulcrum link and said convergent flap to said fulcrum link.

8. An axisymmetrical C/D exhaust nozzle for gas turbine engine power plants having a central axis powering STOVL aircraft as claimed in claim 7 wherein one triangular end of said fulcrum link is attached to said link means attaching said convergent flap and another triangular end of said fulcrum link is attached to said link means attaching said divergent flap.

* * * * *